United States Patent Office 3,347,568
Patented Oct. 17, 1967

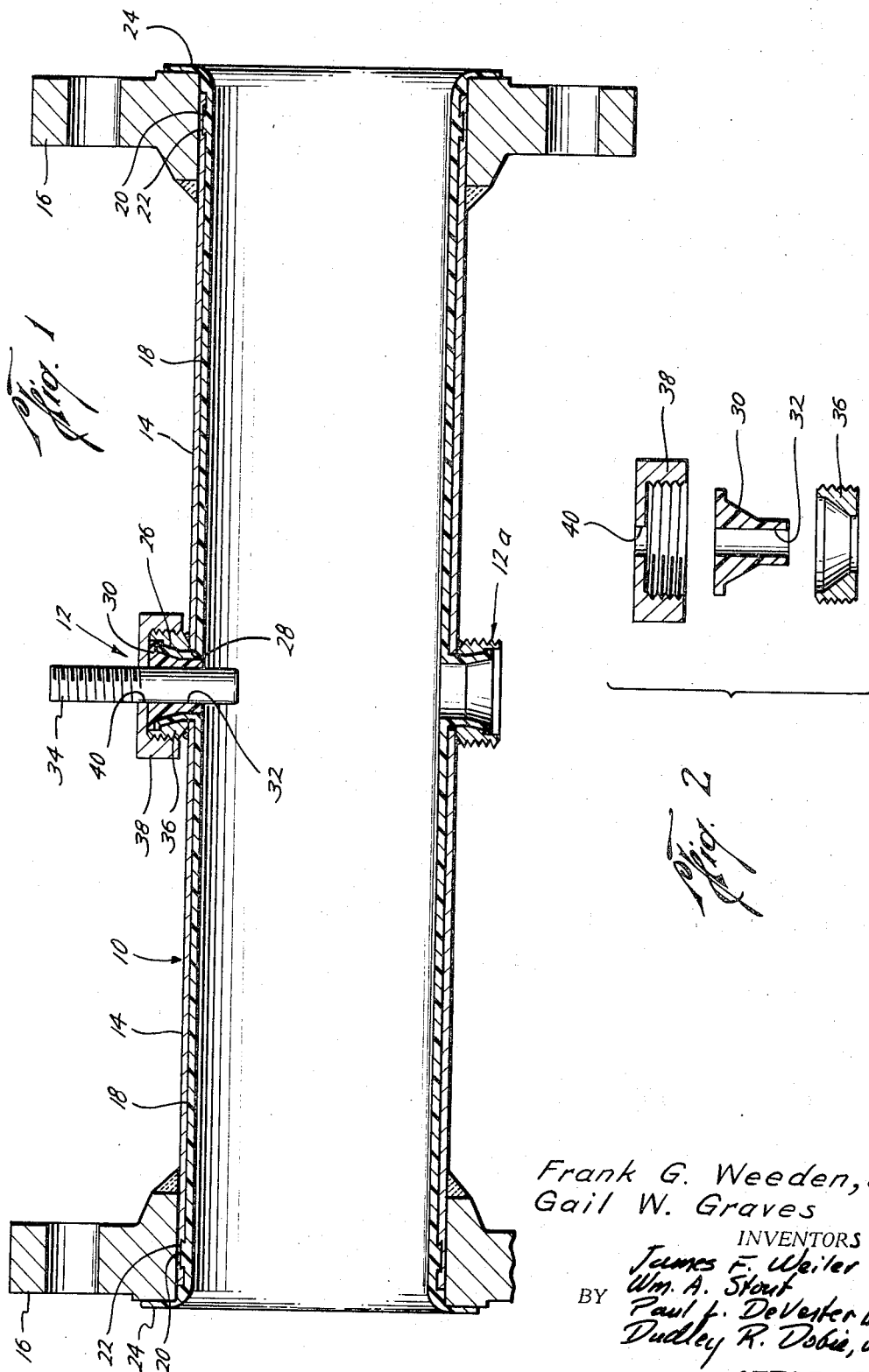

3,347,568
CORROSION PROOF FLOWMETER
Frank G. Weeden, Jr., and Gail W. Graves, Houston, Tex., assignors to John L. Dore Co., Houston, Tex., a corporation of Texas
Filed Oct. 20, 1965, Ser. No. 498,328
2 Claims. (Cl. 285—55)

ABSTRACT OF THE DISCLOSURE

A flowmeter having fluorocarbon liner concentrically spaced within a tubular joint, the liner being secured to the interior surface of said joint near each end thereof and having a flared portion intermediate the ends protruding through an aperture of the tubular joint. A boss and nut force a fluorocarbon conical ring having a probe member projecting therethrough into sealing engagement with the flared protrusion of the liner.

---

The present invention relates to an improved flowmeter having a lining for use with corrosive fluids, and more particularly to a probe assembly for use with the lined flowmeter in both vacuum and pressure operations.

As is well known in the art, flowmeters are utilized in fluid operations to determine temperature, pressure, viscosity, rate of flow and other characteristics of a particular stream. Flowmeters are precision instruments with many having probes depending upon the characteristics of the stream to be measured. When used with corrosive fluids, these flowmeters are continually subject to leakage around the probe. In many instances, such leakage is slow and undetected and gradually attacks the housing behind the liner resulting in a rupture of the flowmeter. Such ruptures create extremely hazardous conditions not to mention the possibility of damage to expensive equipment. In this connection, the present invention provides a lined flowmeter having a positive seal to prevent leakage around the probe and is uniquely adaptable to vacuum operations although being extremely useful in pressure operations as well. The lining and sealing means of the present invention are preferably formed of a fluorocarbon resin so as to be useful with nearly all corrosive substances in a wide range of temperatures.

It is, therefore, an object of the present invention to provide a lined flowmeter assembly which will effectively seal a probe mounted therein and at the same time permit rapid installation and removal of the probe when necessary.

A further object of the present invention is to provide a flowmeter which is especially adapted for use in vacuum operation whereby the liner remains in intimate contact with the flowmeter wall and does not collapse to obstruct flow of fluids or interfere with the desired measurement of fluid characteristics.

Another object of the present invention is to provide a flowmeter having a positively sealed probe capable of being rapidly installed or removed from the housing of the lined flowmeter.

Still another object of the present invention is to provide a lined flowmeter wherein the probe is effectively sealed against leakage to prevent rupture or failure in both vacuum and pressure operations.

Yet another object of the present invention is to provide a flowmeter in which a great number of corrosive fluids may be accommodated in a wide temperature range through the use of a lining and probe seal assembly made of a fluorocarbon such as Teflon, a polymerized tetrafluoroethylene resin, Fluorothene, a polychlorotrifluorothylene, Kel-F, a polymerized trifluorochloroethylene resin, fluorinated ethylenepropylene and the like. In addition to these fluorocarbon materials being highly inert with respect to the commonly encountered corrosive fluids, the majority are capable of use in temperature ranges far exceeding those of other plastic or rubber products of the prior art.

Consequently, it is another object of the present invention to provide a lined flowmeter assembly which is capable of use in relatively high fluid temperature ranges, as well as capable of use with the commonly encountered corrosive fluids.

When flowmeters are utilized in metering a variety of corrosive fluids, or when the flow rates are changed such as to require insertion of a different probe, or when a variety of characteristics are to be measured sequentially through a single probe aperture in a lined flowmeter, it is necessary that the probe be removed and replaced. In this connection it is highly desirable that a minimum amount of parts be required to effect a maximum positive seal around the probe. Therefore provision is made in the present invention for interchanging probes in a flowmeter in a most expeditious manner while maintaining ability of the flowmeter to effect a positive seal around the probe in both vacuum and pressure operation through the use of a liner secured to the flowmeter housing and a conical receiver protrusively flared through an aperture in such housing so as to receive a conical ring wedgably engaging a probe by use of boss means attached to the housing.

Other and further objects, features and advantages will be apparent from the following description of a presently preferred embodiment of the invention given for the purpose of disclosure, taken in conjunction with the accompanying drawing, where like character references designate like parts throughout the several views and where:

FIGURE 1 is a cross-sectional side view of the lined flowmeter and probe assembly of the present invention, and FIGURE 2 is a cross-sectional exploded side view of the probe sealing means of the present invention.

Referring now to FIGURE 1, the reference numeral 10 generally designates the flowmeter of the present invention and the reference numeral 12 generally designates the probe sealing means of the flowmeter. The flowmeter 10 comprises a metal tubular joint or wall 14 having flanged ends 16 secured thereto.

A plastic liner 18 preferably formed of a fluorocarbon resin for duty with corrosive fluids or other substances is concentrically disposed within the tubular joint 14 and secured thereto by the use of tongues or tenons 20 formed on and projecting beyond the outer surface of the liner 18 for engagement with mortises or dovetailed grooves 22 which may be arranged axially, helically or annularly, the latter being shown in the drawing. Such tenons and mortises are preferably spaced near the flanged ends of the flowmeter 10 so that by cooperation with probe means, collapse of the liner is prevented when the flowmeter is used in a vacuum operation. In addition, the liner preferably has flared ends 24 to facilitate installation of the flowmeter 10 in a fluid flow line.

The probe means 12 as shown in FIGURE 1 coacts with protrusively flared conical receiver 26 which is integrally formed of the liner 18 and projects through a hole or aperture 28 in the wall of the tubular joint 14. A conical ring 30 preferably formed of a fluorocarbon wedgably engages the conical receiver 26 and also has a concentric or axial hole 32 to receive a probe 34. This assembly is secured to the tubular joint 14 by means of a boss 36 threadably engaged by a boss nut 38 having a concentric hole 40 to receive the probe 34. The boss assembly is more clearly shown in the exploded view of FIGURE 2.

In assembling the probe means 12 for actual usage, the probe 34 is inserted into the aperture 32 of the conical ring 30 which in turn is placed into the protrusively flared conical receiver 26. The boss nut 38 is then placed over the probe 34 and threadably engaged or otherwise secured to the boss 36. Force of the boss nut 38 engaging the boss 36 causes the conical ring 30 to wedgably engage the conical receiver 26 in turn placing evenly distributed pressure around the periphery of the probe 34 thereby creasing a positive seal. It is, of course, recognized that a plurality of probe means may be provided in the flowmeter assembly as is represented generally by the reference numeral 12a. Such other probe means will, in fact, provide further anchorage for the liner 18 intermediate the ends of the flowmeter.

Any suitable resilient material may be used for the liner 18, flared conical receiver 26, and the conical ring 30. However, for use with corrosive substances, a fluorocarbon liner and ring assembly is preferred. The more suitable fluorocarbons include polytetrafluoroethylene or Teflon, polychlorotrifluoroethylene or Fluorothene, trifluorochloroethylene or Kel-F, or fluorinated ethylenepropylene. These materials are chemically inert to most corrosive materials and are useful over a wide range of temperatures. It will be recognized by those skilled in the art that copolymers of these materials may be formed with other substances which will also exhibit favorable characteristics for use in the present invention.

The preferred technique of fabricating the flowmeter of the present invention employs the transfer molding process. The tubular joint 14 having flanges 16 on each end and at least one hole 28 intermediate the ends is placed around a mandrel not shown. The boss 36 is secured to the outer wall of the tubular joint 14 adjacent the hole 28 and thermoplastic fluorocarbon resin is placed within a cavity which is maintained between the mandrel and the tubular joint. The resin is heated to conform to the cavity as well as the boss and is then cooled to ambient temperature. The mandrel is removed and the protrusive flare is machined to its final form. The conical ring 30 may be fabricated in a similar manner. Although this process is adaptable only for use of thermoplastic fluorocarbons, it may be fabricated in other ways so as to make use of thermosetting fluorocarbons.

Thus provided is a flowmeter having a readily removable probe which is positively sealed when in position. Construction of the flowmeter as described renders it uniquely adaptable to vacuum operation in that the fluorocarbon liner will not separate from the walls of the tubular joint of the flowmeter thus preventing obstruction and leakage.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangements of parts may be resorted to without departing from the spirit and scope of the invention as hereinafter claimed.

What is claimed is:

1. A flowmeter for use in transmission of corrosive substances under positive or negative pressures and in wide temperature ranges comprising,
   a tubular joint having flanged ends and an aperture in the side thereof intermediate said flanged ends,
   a fluorocarbon liner concentrically disposed within said tubular joint and flared outwardly at said flanged ends of said joint,
   female holding means formed on the inner wall of said joint near each end thereof,
   male holding means formed on the external surface of said liner opposite said female holding means,
   said male holding means and said female holding means being in interlocking engagement whereby said liner is secured to said joint against axial and radial displacement therefrom,
   tenon means formed on and projecting beyond the outer surface of the liner for secure engagement with the mortises of the tubular joint,
   a flared conical receiver member integrally formed of the liner protruding exteriorly through the aperture of the tubular joint,
   a fluorocarbon conical ring having an axial aperture for receiving a probe,
   probe means for engaging the axial aperture of the conical ring, and
   boss means affixed to the tubular joint for engaging the conical ring and probe with the conical receiver.

2. The invention of claim 1 wherein the boss means includes, a boss secured to the tubular joint and concentrically seating the conical ring, and
   a boss nut threadably engaging the boss and wedgably forcing the conical ring and probe into engagement with the flared conical receiver.

References Cited

UNITED STATES PATENTS

| | | | |
|---|---|---|---|
| 2,165,622 | 7/1939 | Donahue | 285—55 X |
| 2,243,356 | 5/1941 | Olson | 285—192 |
| 2,374,763 | 5/1945 | Martin | 285—201 |
| 2,742,784 | 4/1956 | Brous | 73—228 |
| 3,148,896 | 9/1964 | Chu | 285—55 |
| 3,284,106 | 11/1966 | McIntosh et al. | 285—55 |

FOREIGN PATENTS

| | | |
|---|---|---|
| 1,078,733 | 5/1954 | France. |

CARL W. TOMLIN, *Primary Examiner.*

R. G. BERKLEY, *Assistant Examiner.*

UNITED STATES PATENT OFFICE
CERTIFICATE OF CORRECTION

Patent No. 3,347,568                          October 17, 1967

Frank G. Weeden, Jr., et al.

It is certified that error appears in the above identified patent and that said Letters Patent are hereby corrected as shown below:

Column 4, lines 21 to 23, cancel "tenon means formed on and projecting beyond the outer surface of the liner for secure engagement with the mortises of the tubular joint,".

Signed and sealed this 27th day of January 1970.

(SEAL)
Attest:

Edward M. Fletcher, Jr.                      WILLIAM E. SCHUYLER, JR.
Attesting Officer                             Commissioner of Patents